United States Patent [19]
Richardson et al.

[11] Patent Number: 6,119,842
[45] Date of Patent: Sep. 19, 2000

[54] ARTICLE ALIGNMENT DEVICE

[75] Inventors: Simon John Richardson; Robert Bennett, both of Birmingham, United Kingdom

[73] Assignee: Ishida Co., Ltd., Kyoto, Japan

[21] Appl. No.: 09/040,318

[22] Filed: Mar. 18, 1998

[30]     Foreign Application Priority Data

Mar. 19, 1997 [GB]  United Kingdom ............... 9705686

[51] Int. Cl.⁷ .................................................. B65G 11/00
[52] U.S. Cl. ........................ 193/2 R; 198/396; 198/532
[58] Field of Search .................................. 193/2 R, 3, 4,
          193/25 FT, 25 A; 198/390, 396, 532, 540

[56]             References Cited

U.S. PATENT DOCUMENTS

| | | | |
|---|---|---|---|
| 1,430,011 | 9/1922 | Heath | 193/2 R |
| 1,893,903 | 1/1933 | Mullins | 193/2 R X |
| 3,304,973 | 2/1967 | Norris | 198/396 X |
| 3,868,045 | 2/1975 | Snell | 221/194 |
| 4,514,959 | 5/1985 | Shroyer | 53/428 |
| 4,586,313 | 5/1986 | Maglecic | 53/437 |
| 4,681,209 | 7/1987 | Marti | 198/392 |
| 5,012,913 | 5/1991 | Kramer | 193/2 R |
| 5,340,269 | 8/1994 | Caridis et al. | 414/786 |
| 5,426,930 | 6/1995 | Badiali et al. | 198/532 X |

FOREIGN PATENT DOCUMENTS

| | | | |
|---|---|---|---|
| 0 723 140 A1 | 7/1996 | European Pat. Off. | |
| 63-300012 | 12/1988 | Japan | 198/390 |
| 677 | of 1910 | United Kingdom | |

*Primary Examiner*—James R. Bidwell
*Attorney, Agent, or Firm*—Staas & Halsey, LLP

[57]              ABSTRACT

A combinatorial weighing apparatus that combines articles after aligning same. The articles are input to the apparatus via hoppers, which can be selectively discharged to an alignment tray based upon the weight of the articles within the hoppers. A predetermined weight, or at least a weight within a margin of error of the predetermined weight, is discharged through a chute to an alignment tray. The chute narrows from an inlet position to an outlet position, and aligns the articles as they pass therethrough. Once in the alignment tray, the tray is shaken in an unsymmetrical manner so as to further align the articles. Once the alignment is complete, a gate beneath the tray opens and the aligned articles drop into a receptacle. The present invention is particularly useful in aligning elongate articles, such as bread sticks, and other food stuffs.

36 Claims, 7 Drawing Sheets

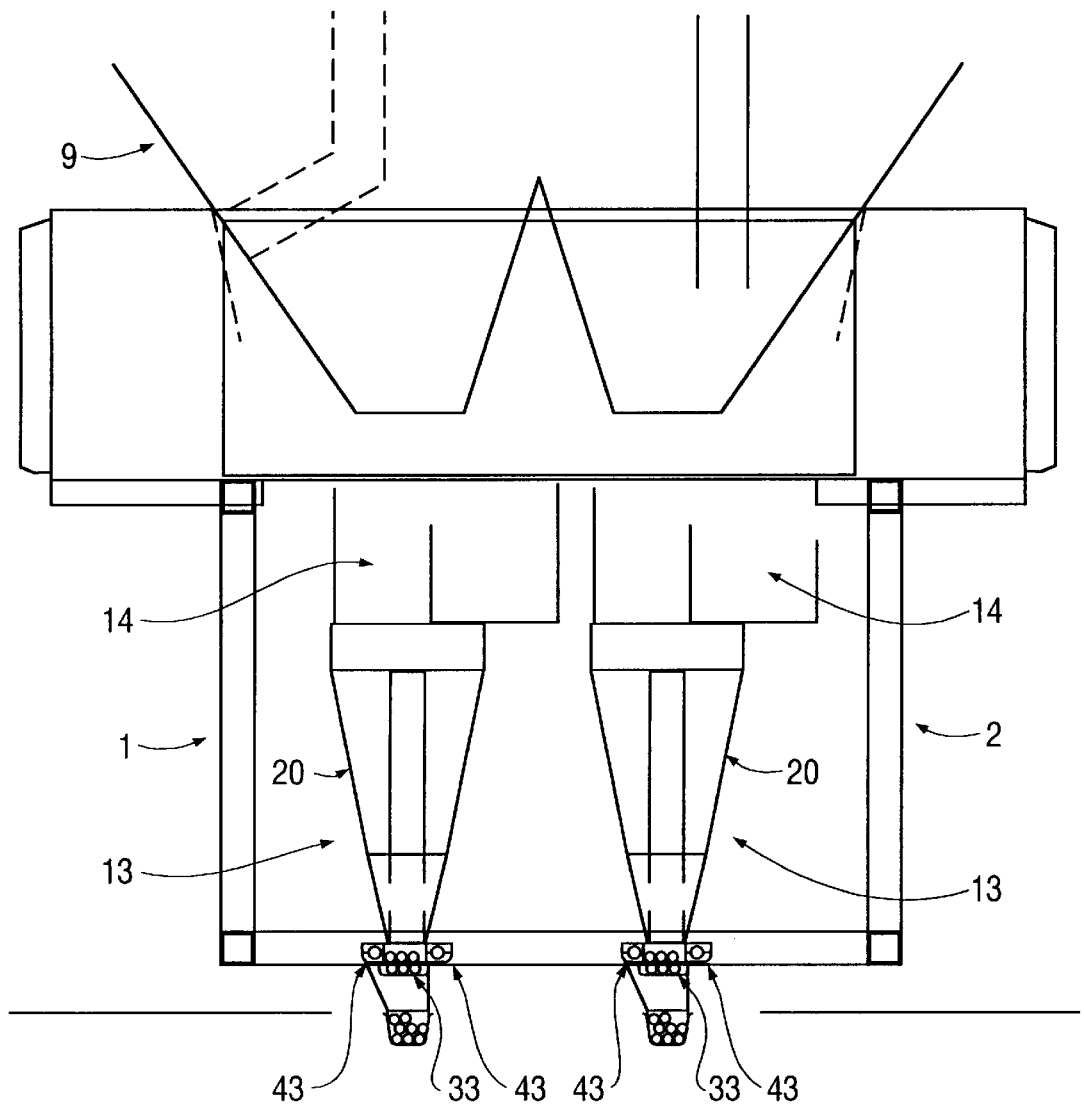

ARTICLE ALIGNMENT DEVICE

CROSS REFERENCE TO RELATED APPLICATIONS

This application is based upon and claims priority from British Patent Application 9705686.5 filed Mar. 19, 1997, the contents of which are incorporated herein by reference.

BACKGROUND OF THE INVENTION

1. Field of the Invention

The invention relates to an article alignment device for use in article dispensing apparatus such as a combinatorial weighing apparatus in which batches of articles are weighed by a plurality of weighing units respectively, and a combination of weighing units is selected that provides a total weight equal to or most closely approximating a target weight within a predetermined tolerance and then the articles are discharged from the selected weighing units. The invention is particularly suited for use with apparatus for dispensing foodstuffs comprising elongate articles such as bread sticks and the like.

2. Description of the Related Art

Conventionally, bread sticks have been manually loaded into receptacles for storage and subsequent sale although more recently a system has been devised in which such sticks are supplied vertically into a hopper which is then rotated through 90° following which the group of bread sticks is dropped into a receptacle. The problem with this latter arrangement is that the sticks have a relatively short length compared with the width of a hopper, with the result that some can be misaligned on entry into the hopper and result in a jumble of sticks which will not load neatly into a receptacle.

SUMMARY OF THE INVENTION

In accordance with the present invention, an article alignment device for use in article dispensing apparatus such as a weighing apparatus that combines objects comprises a chute defining a throat which extends and narrows from an inlet position downwardly to an outlet position at which the articles are discharged, so as to cause elongate articles having an elongate dimension greater than the lateral dimension of the chute at the outlet position to align themselves in the direction of travel along the chute.

The present invention is an article alignment device including a chute as defined above which has been found to result in the much more efficient supply of aligned articles at the outlet position. Providing a gradually narrowing throat towards the outlet position acts to cause increased alignment of the articles as they pass along the chute while preventing them from substantial misalignment.

The chute could have a variety of cross-sections including circular or polygonal and may be closed around its circumference or open. In the preferred embodiment, the chute comprises a central base and pair of side walls, the angle of inclination of the side walls to the base decreasing from the inlet position to the outlet position.

Although the central base could have a rectilinear form, preferably it is concave from the inlet position to the outlet position, when viewed from above. It has been found that this structure results in optimal supply speeds and alignment efficiencies. Typically, the central base will comprise a planar strip.

In some cases, the lateral dimension of the central base could vary along its length but preferably the central base has a substantially constant lateral dimension along its length.

Typically, the central base is angled at substantially 10° to the horizontal at the outlet position although this may be increased up to about 30°.

The height and length of the chute are chosen depending upon the articles to be dispensed so as to impart sufficient energy to the articles as they fall down the chute so that they will align, but be delivered from the outlet position without breakage.

The articles can be delivered into the chute in any conventional manner and in any orientation. It has been found that if the articles are delivered with their elongate dimension extending along the chute rather than laterally across the chute, they may take significantly different times to pass along the chute thus delaying operation. Preferably, therefore, the device further comprises an inlet guide located at the inlet position of the chute, the inlet guide having front and back walls connected by a pair of spaced side walls. When the chute is formed with a central base, the front and back walls may extend substantially parallel with a lateral dimension of the central base. The front and back walls may be angled towards the chute inlet position.

In some cases, the articles can simply be discharged from the end of the chute at the outlet position. In the preferred arrangement, however, more control is achieved over discharge by providing an aperture in the base at the outlet position, the side walls of the chute extending along opposite sides of the aperture. In this case, the side walls continue to guide the articles as they reach the outlet position and begin to pass through the aperture.

The articles could drop onto a moving conveyor or the like where they are conveyed to a remote location for loading into containers. Preferably, however, the conveyor carries individual trays into which the articles are loaded. The trays could move in a step-wise or continuous fashion depending upon the number of articles to be loaded into each tray, the speed of supply of articles and movement of the trays, and the degree of alignment.

In the preferred embodiment, further alignment of the articles is achieved by providing an alignment tray located at the outlet position to receive articles from the chute; and a device for moving the tray in a lateral direction so as to further align articles in the tray.

The alignment tray is provided between the chute and the ultimate destination of the articles to enable the articles to be fully aligned. Alignment is achieved by moving the tray in a lateral direction, preferably substantially parallel with the elongate dimension of the articles.

Typically, the moving device will impart a shaking motion to the alignment tray, rather than a smooth movement, so as to minimis the amount of movement needed to achieve alignment. Although the shaking motion could follow a very symmetrical pattern, it has been found preferable if the moving device causes the alignment tray to move in an unsymmetrical manner.

The unsymmetrical motion can be achieved in a variety of ways but in the preferred approach the moving device causes the alignment tray to pause at the home position longer than at the away position. In this case, the time for moving the alignment tray between the home and away positions may differ depending upon the direction of movement but conveniently these times are the same.

In order to discharge the articles from the tray, when provided, the device may further comprise a gate beneath the outlet position, which can be retracted to allow articles in the tray to drop into a receptacle.

The gate may form part of the tray but conveniently comprises a plate over which the sides of the tray can be moved independently of the base. This enables the gate to be operated independently of the tray. In order to facilitate a quick exit from the alignment tray, the sides of the tray are preferably angled outwardly in the downward direction.

When articles are released from the tray, they will drop into a receptacle beneath the tray. In some cases, in order to maintain alignment, a guide chute may be provided beneath the tray to assist passage of aligned articles into a receptacle.

The alignment device can be used for aligning articles supplied manually to the inlet position but is particularly useful with article dispensing apparatus, such as a weighing apparatus that combines objects, which further comprises a supply system for supplying elongate articles to the inlet position; and a receptacle supply system for supplying receptacles to the outlet position for receiving articles which have been discharged from the chute.

BRIEF DESCRIPTION OF THE DRAWINGS

These and other objects and features of the present invention, along with methods of use and operation, will become apparent from the detailed description of the invention and the appended claims and drawings, all of which form a part of this application.

An example of article dispensing apparatus in the form of a combinatorial weighing apparatus including article alignment devices according to the invention will now be described with reference to the accompanying drawings, in which like reference numerals refer to like elements, and:

FIG. 2 is an enlarged, schematic, part side elevation of the apparatus shown in FIG. 1;

DETAILED DESCRIPTION OF THE PRESENTLY PREFERRED EXEMPLARY EMBODIMENT

Figure 1:
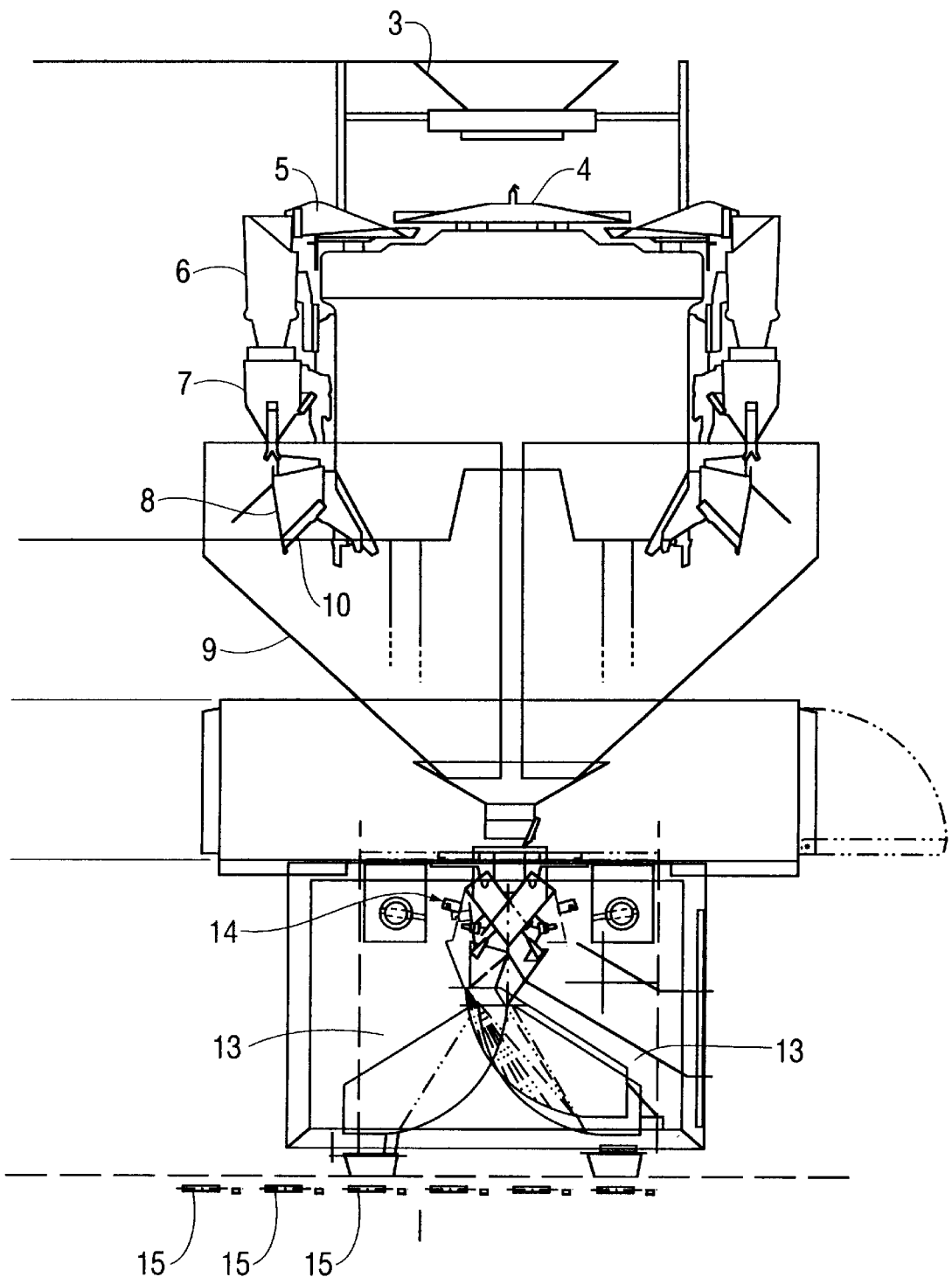
FIG. 1 is a schematic front elevation of a combinatorial weighing apparatus provided with an example of an alignment device according to the invention.

The combinatorial weighing apparatus shown in the drawings is formed as a double mechanism as can be seen most clearly in FIG. 2. The apparatus has a left side section 1 and a right side section 2 each of which processes bread sticks or other elongate articles independently and feeds the articles into separate lines of tray-like receptacles. For convenience, therefore, we will describe the construction of the left side apparatus although it should be understood that the right side apparatus will be constructed in an identical manner.

The apparatus, as shown in FIG. 1, comprises an in-feed chute 3 to which elongate articles such as bread sticks are fed by a conveyor (not shown). The in-feed chute 3 is positioned above a dispersion table 4 onto which the articles fall and which is vibrated (by a device not shown) to cause the articles to move radially outwardly to respective ones of a number of circumferentially spaced radial feeders 5 which are also vibrated to feed the articles to corresponding pool hoppers 6. Each pool hopper 6 is closed at its lower end by a gate (not shown) which can be selectively opened so that articles in the pool hopper drop into a respective weigh hopper 7 which allows the articles to be weighed, this information being passed to a main controller (not shown) to be stored. The main controller selectively causes gates on the weigh hoppers 7 to open allowing the contents of the weigh hoppers to drop into respective booster hoppers 8. Weighing hoppers 7 which have been evacuated as a result of the discharge to booster hoppers 8 are then charged with articles from the associated pool hoppers 6. Pool hoppers 6 which have been evacuated as a result of the discharge to weighing hoppers 7 are again charged with articles by vibrating the associated radial feeders 5.

The main controller performs a combinatorial computation, based on weight values of articles which are weighed by weigh hoppers 7 and then fed to booster hoppers 8 to select a combination of booster hoppers 8, the weight of articles which is equal to a target weight or closest to the target weight within a predetermined tolerance.

The booster hoppers 8 are positioned above a discharge chute 9 so that when the main controller causes gates 10 on selected booster hoppers 8 to open based on a combinatorial computation, the articles fall down into the chute 9. The lower end of the chute 9 is closed by a ring shutter (not shown) and articles discharged from booster hoppers 8 are stored temporarily in the chute 9 by the ring shutter.

The foregoing description is for a case where a combination computation is conducted by using weight values of articles in booster hoppers 8. It is also possible to conduct a combination computation based on weight values of articles in weigh hoppers 7 and booster hoppers 8. A combination of weigh hoppers 7 and/or booster hoppers 8 is selected which provide a sum weight that is equal to a target weight or closest to the target weight within a predetermined tolerance and gates of selected weigh hoppers 7 and/or booster hoppers 8 are opened to allow the articles to fall down into the chute 9. Evacuated booster hoppers 8 are again supplied with articles from the associated weigh hoppers 7, evacuated weigh hoppers 7 are again supplied with articles from the associated pool hoppers 6, and evacuated pool hoppers 6 are supplied with articles by vibrating the associated troughs 5 which are radially arranged.

When a combination of booster hoppers 8 or a combination of weigh hoppers 7 and booster hoppers 8 is not obtained which provides a sum weight being closest to a target within a predetermined tolerance, an error diverting timing hopper 14 is used to discharge articles out of the apparatus, by opening gates of one or more booster hoppers 8 or one or more of weigh hoppers 7 and/or booster hoppers 8. Evacuated booster hoppers 8 or weigh hoppers 7 are supplied again with articles to conduct a combinatorial computation. When the kind of article is changed, the error diverting hopper 14 is also available to discharge articles remaining in the apparatus by vibrating a dispersion table 4 and radial feeders 5 and by opening pool hoppers 6, weigh hoppers 7 and booster hoppers 8.

The action of the alignment chute assembly 13 will be described in more detail below. Articles exit from the alignment chute assembly 13 in the form of groups—of aligned articles (typically eight in a group) which drop into respective receptacles 15 which are conveyed under an outlet position of the chute by a conveyor system.

Figure 3A:
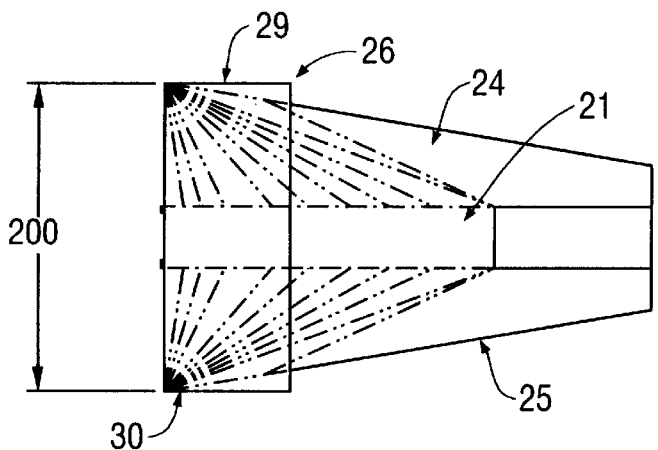
FIGS. 3A–3C are a plan, side elevation and front elevation respectively of one of the alignment chutes shown in FIGS. 1 and 2.
Figure 3B:
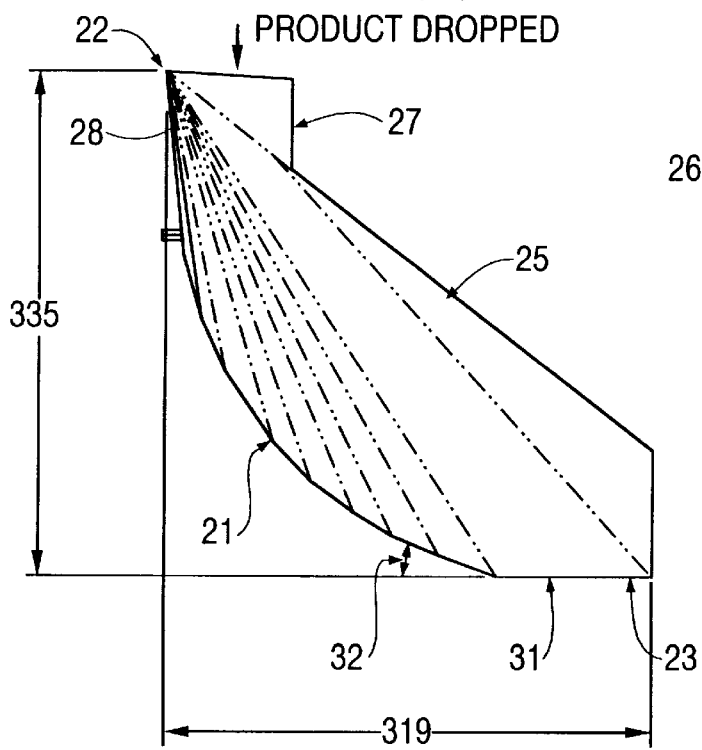
Figure 3C:
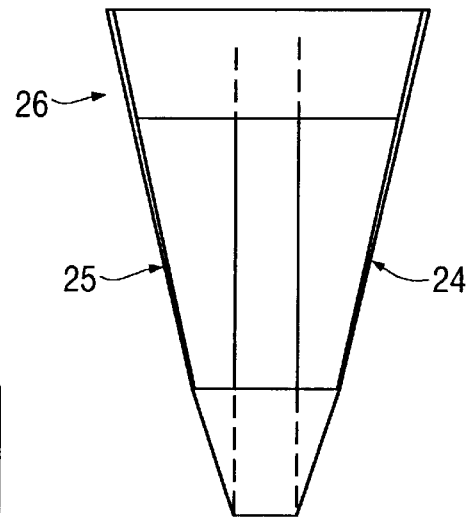

The alignment chute assembly is shown in more detail in FIGS. 3 and 4. The assembly comprises an alignment chute 20 having a central base 21, in the form of a planar, concave strip, extending from an inlet position 22 to an outlet position 23, and a pair of side walls 24, 25 extending along opposite sides of the central base 21. The side walls 24, 25 initially define relatively large angles with the central base 21 but gradually define smaller angles with the central base 21 so as to form a narrowing throat from the inlet position 22 to the outlet position 23. The central base 21 has a width typically of about 40 mm while the other dimensions of the chute (in millimeters) are typically as defined in FIG. 3. The upper end of the chute 20 includes front and back walls 27, 28 and a pair of side walls 29, 30, the back wall 28 being formed by part of the base 21. The lower end of the chute 20 includes an opening 31 along side which the side walls 24, 25 extend. The central base 21 terminates at one end of the opening and, at that point, is angled to the horizontal (as seen at 32) at an angle of between 10° and 30°.

As elongate articles are dispensed from the timing hopper 14, they enter the chute 20 at 26. The length of the articles is greater than the lateral dimension of the central base 21 (i.e. greater than 40 mm) and would typically be 64–76 mm. The articles fall down along the chute 20 and during their passage are gradually aligned by the side walls 24, 25 until they lie along the length of the central base 21. The articles reach the opening 31 and then drop through the opening into an alignment tray 33 positioned beneath the opening 31 (FIG. 4).

In summary, articles are dropped into the inlet more or less vertically. The chute deflects the articles as they fall so that they are discharged in a near horizontal plane. Because of the restrictive nature of the side walls (the spine being narrower than the length of the article) the articles are aligned during their route through the chute.

Figure 4A:
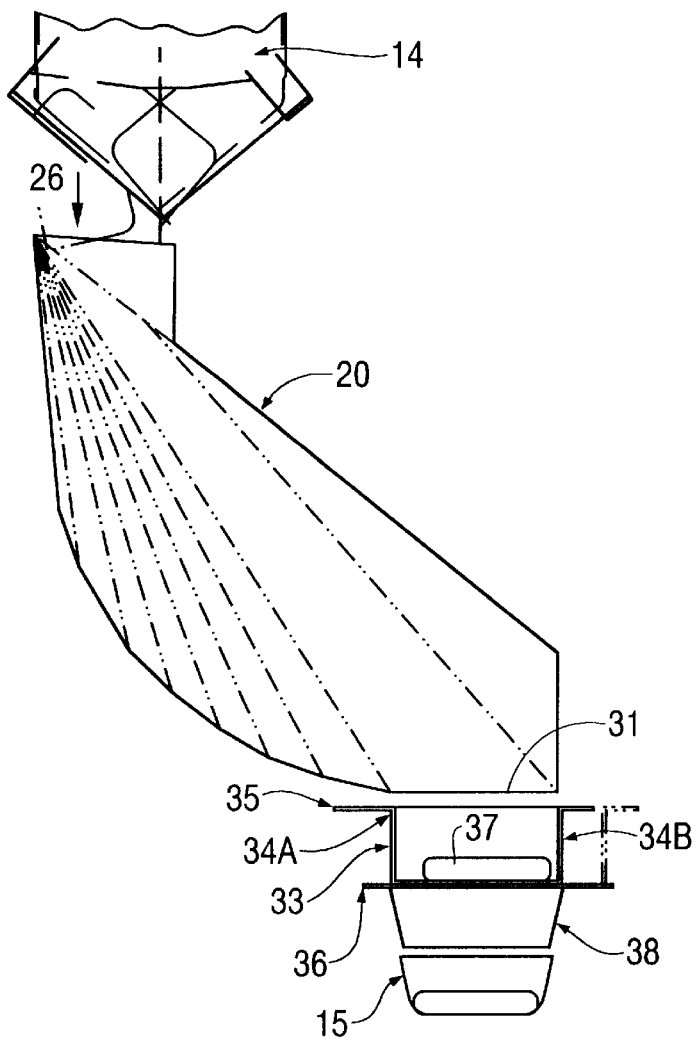
FIGS. 4A and 4B are a side elevation and front elevation respectively of the alignment chute shown in FIG. 3 in conjunction with other parts of the combinatorial weighing apparatus.
Figure 4B:
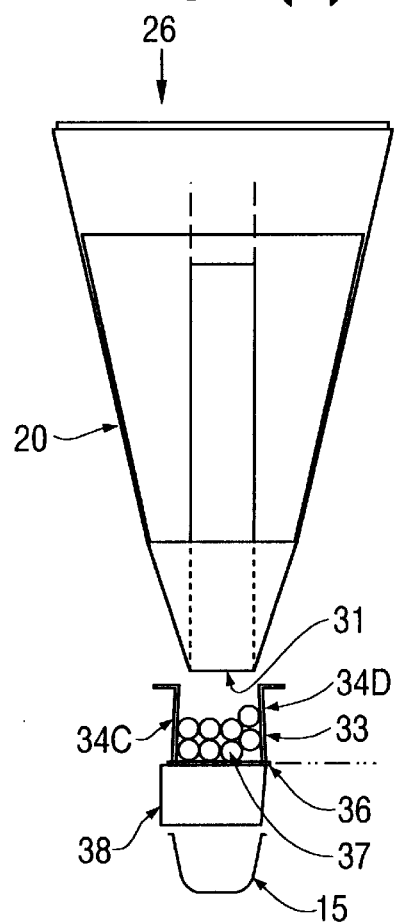

The tray 33 has four sides 34A–34D as shown in FIGS. 4(A) and 4(B). The sides 34C and 34D are angled slightly inwardly towards the top of the tray 33. The tray also has an outwardly extending flange 35 positioned around the top edges of the walls 34A–34D. The base of the tray 33 is closed by an independent sliding gate 36 to be described in more detail below. The articles, as seen at 37, collect in the tray 33 and rest on the gate 36. The tray 33 is then shaken to the left and right as shown in FIG. 4A between a home position shown in solid lines and an away position shown in chain dotted lines. The shaking motion will be described in more detail below. The result of this shaking motion is that the articles 37 neatly align within the tray 33 with their ends generally flush. The gate 36 is then opened and the articles 37, typically eight in number, but any other number is possible depending on the size of the receptacle 15, drop in a group through an inlet chute 38 having inwardly tapering walls, into a receptacle 15.

Figure 5A:
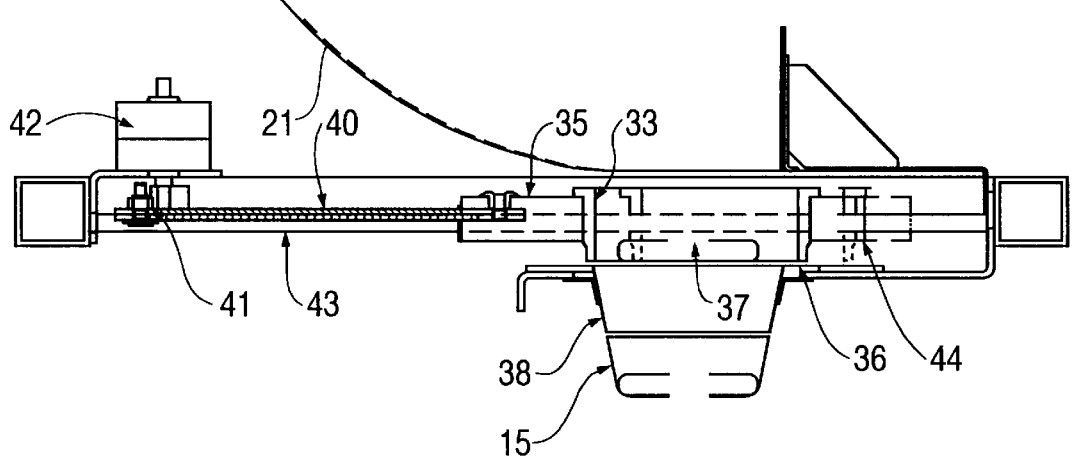
FIGS. 5A and 5B are side and plan views illustrating the mechanism for shaking the alignment tray.
Figure 5B:
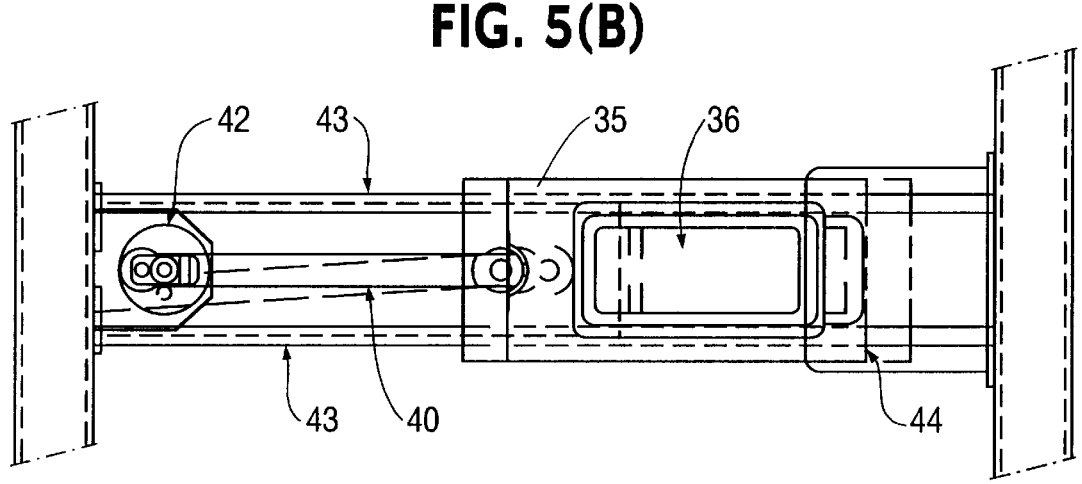

The shaking motion of the tray 33 is achieved using the mechanism shown in FIGS. 5(A) and 5(B). The tray is connected via the flange 35 to a linearly reciprocative connecting rod 40 which is connected via a crank 41 to a rotary cylinder motor 42. When the motor 42 is actuated, it rotates the crank 41, the rotation being converted to a linear movement to cause linear motion of the connecting rod 40 which causes corresponding linear, shaking movement of the tray 33. The tray 33 is guided on a pair of laterally spaced guide rods 43 about and between which a bracket 44 extends connected to the flange 35.

Figure 7:
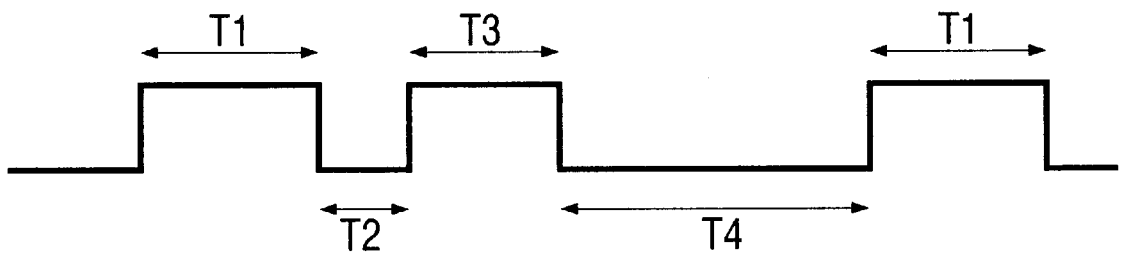

FIG. 7 illustrates a typical example of the motion imparted to the tray 33. During a single shake cycle, as shown in FIG. 7, the tray 33 is first moved from its home position to its away position during a period T1 of typically 75 milliseconds. It then pauses at the away position for a time T2 of typically 25 milliseconds before returning to the home position during a period T3 of 75 milliseconds. The tray will then pause in this home position for a period T4 of typically 125 milliseconds before commencing the next cycle. In this way, it can be seen that once the shaking process begins, the tray will pause in the home position for a longer period than in the away position. It has been found that with up to about five shake cycles of the type shown in FIG. 7, the articles in the tray 33 can be fully aligned.

Figure 6:
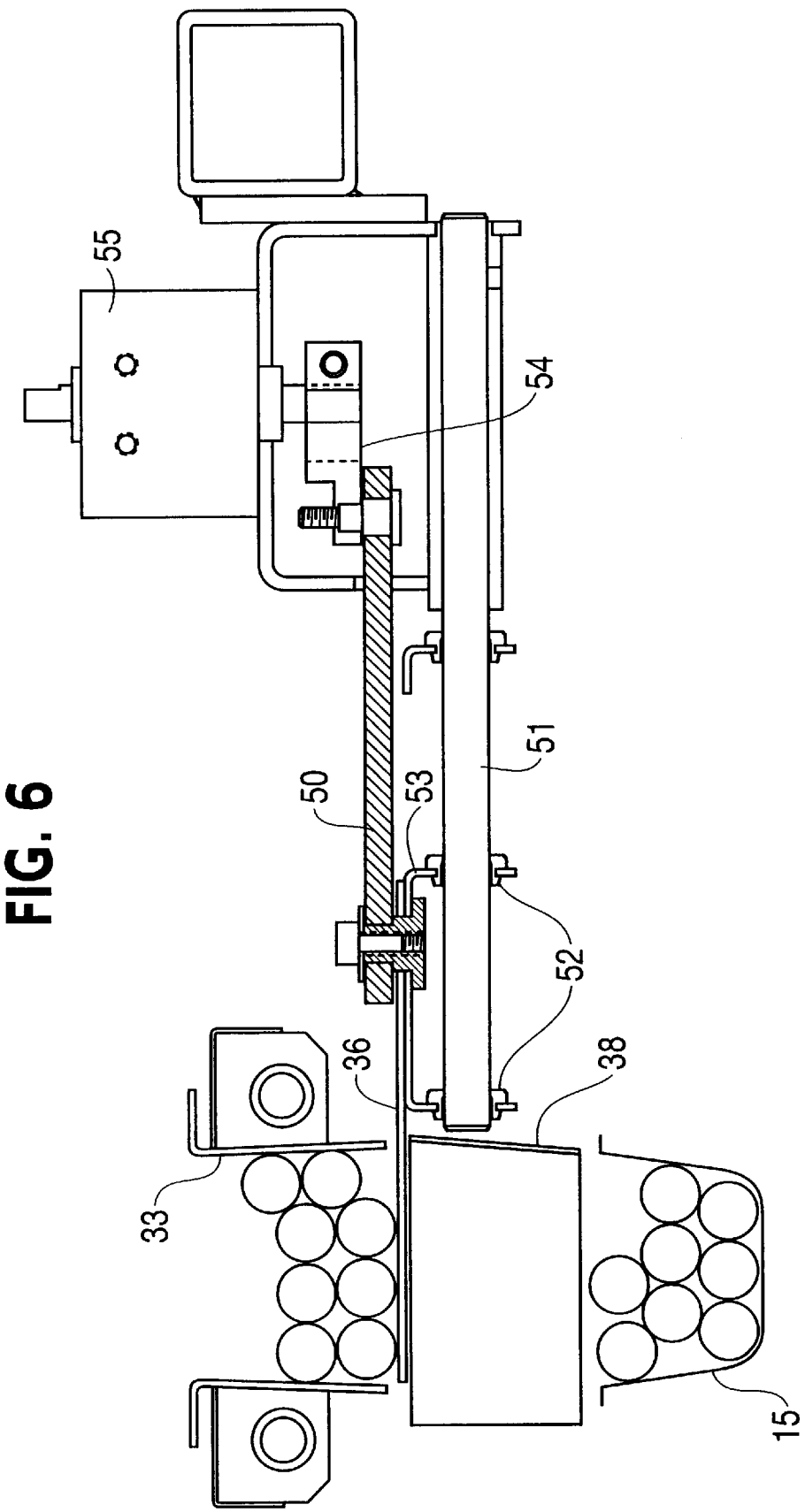
FIG. 6 illustrates the mechanism for operating a gate beneath the alignment tray; and, FIG. 7 is a timing diagram illustrating operation of the shaking mechanism shown in FIG. 5.

Operation of the gate 36 will now be described with reference to FIG. 6. The gate 36 is mounted to a connecting rod 50 and is supported for linear movement on a guide rod 51 via linear bearings 52 connected to a bracket 53. The connecting rod 50 is connected to a crank mechanism 54 which in turn is mounted to a rotary cylinder motor 55. When the motor 55 is actuated, the crank mechanism 54 is rotated which causes the rod 50 to reciprocate linearly thus causing the gate 36 to be inserted under and retracted from the tray 33 respectively.

The motors 42, 55 are controlled from the main controller (not shown). Operation of the motors 42, 55 is timed with the supply of articles to the chute 20 so that in a typical operating cycle articles are supplied to the chute 20 down which they fall so as to align and then drop into the tray 33. The tray 33 is then shaken by activating the motor 42 and when it finally stops at its home position, the gate 36 is withdrawn by operating the motor 55. The articles drop through the inlet chute 38 into the receptacle 15. The receptacle 15 is then moved by the conveyor to bring a new, empty receptacle into alignment.

As soon as or even before the gate 36 opens, the next articles are supplied to the top of the chute 20, the gate 36 being closed sufficiently quickly to prevent these next articles falling into the inlet chute 38. In this way, it has been found that up to 50 receptacles per minute can be filled with articles.

The left side section of a combinatorial weighing apparatus and an article alignment device according to an embodiment of the present invention has been described above. The right side section performs the same operation as in the left side section.

In the embodiment described above, two ring shutters and two article alignment devices are installed on right and left sides in a combination weighing machine. But, the invention is applicable to a combination weighing apparatus having one, three, or more ring shutters and alignment devices. As a further alternative, articles may be discharged directly from the discharge chute 9 to the timing hopper 14 without using a ring shutter.

Further, the invention is also applicable to a combination counting apparatus wherein a combination having the sum of article numbers equal to a desired number or nearest the number within a preset range of allowance is obtained by dividing weights of articles in weigh hoppers 7 by the average unit weight of an article to get a number of articles in the weigh hoppers and conducting a combinatorial computation of the numbers.

Although certain preferred embodiments have been shown and described, it should be understood that many changes and modifications may be made therein without departing from the scope thereof.

Although the invention has been described for use with combinatorial weighing apparatus, it can be used with a wide variety of article dispensing apparatuses or simply to align articles on to a moving belt or platform.

This invention has been described with reference to the preferred embodiment of this invention. However, various modifications and alternative arrangements are possible, provided they are within the scope of the appended claims.

What is claimed is:

1. An article dispensing apparatus comprising:
   an alignment device including a chute having an inlet portion and an outlet portion;
   a supply system for supplying elongate articles to the inlet portion; and
   a receptacle supply system for supplying receptacles to the outlet portion for receiving articles which have been discharged from the chute, wherein the chute comprises
      a concave base extending from the inlet portion downwardly to the outlet portion of the chute and having a substantially constant lateral dimension along its length, and
      side walls extending from the base, an angle of inclination of the side walls to the base decreasing from the inlet portion to the outlet portion so as to cause elongated articles traveling through the chute and having an elongate dimension greater than the lateral dimension of the base to align themselves in a travel direction along the chute.

2. An article alignment device for aligning elongate articles in an article dispensing apparatus, the device comprising:
   a chute defining a throat that extends and narrows from an inlet position, into which articles are supplied, to an outlet position at which the articles are discharged, so as to cause elongate articles having an elongate dimension greater than the lateral dimension of the chute at the outlet position and launched into the chute with their elongate dimension substantially vertical to align themselves in a horizontal direction at the outlet position, wherein
   the chute comprises a central base and pair of side walls, the angle of inclination of the side walls to the base decreasing from the inlet position to the outlet position, and the central base has a substantially constant lateral dimension along its length.

3. An article alignment device for use in an article dispensing apparatus, the device comprising:
   a chute defining a throat which extends and narrows from an inlet position downwardly to an outlet position at a base thereof at which the articles are discharged, so as to cause elongate articles having an elongate dimension greater than the lateral dimension of the chute at the outlet position to align themselves in the direction of travel along the chutes,
   wherein the chute comprises a central base and pair of side walls, the angle of inclination of the side walls to the base decreasing from the inlet position to the outlet position, and the central base has a substantially constant lateral dimension along its length.

4. A device according to claim 1, wherein the central base has a concave form from the inlet position to the outlet position, when from above.

5. A device according to claim 1, wherein the central base comprises a planar strip.

6. A device according to claim 1, further comprising an inlet guide located at the inlet position of the chute, the inlet guide having front and back walls connected by a pair of spaced side walls.

7. A device according to claim 6, wherein the front and back walls of the inlet guide extend substantially parallel with a lateral dimension of the central base.

8. A device according to claim 3, wherein the chute includes an aperture in the base at the outlet position, side walls of the chute extending along opposite sides of the aperture.

9. A device according to claim 3, further comprising:
   an alignment tray located at the outlet position to receive articles from the chute; and
   a device to move the tray in lateral direction so as to further align articles in the tray.

10. A device according to claim 9, wherein the device to move the tray causes the tray to move in a direction substantially parallel with the elongate dimension of the articles in the tray.

11. A device according to claim 9, wherein the device to move the tray imparts a shaking motion to the alignment tray.

12. A device according to claim 11, wherein the device to move the tray causes the alignment tray to move between, and pause at, home and away positions in an unsymmetrical manner.

13. A device according to claim 12, wherein the device to move the tray causes the alignment tray to pause at the home position longer than at the away position.

14. A device according to claim 12, wherein the device to move the tray causes the alignment tray to move from the home position to the away position and from the away position to the home position during substantially equal time intervals.

15. A device according to claim 9, wherein the tray includes sides that are angled inwardly in the downward direction.

16. A device according to claim 9, further comprising a guide chute beneath the tray to assist passage of aligned articles into a receptacle.

17. A device according to claim 9, further comprising a gate beneath the outlet position, which can be retracted to allow articles to drop into a receptacle.

18. A device according to claim 17, wherein the gate is positioned beneath the alignment tray.

19. A device according to claim 18, wherein the gate comprises a plate over which sides of the tray can be moved independently of the base.

20. An article alignment device for use in an article dispensing apparatus, the device comprising:
   a chute defining a throat which extends and narrows from an inlet position downwardly to an outlet position at a base thereof at which the articles are discharged, so as to cause elongate articles having an elongate dimension greater than the lateral dimension of the chute at the outlet position to align themselves in the direction of travel along the chute;
   an alignment tray located at the outlet position to receive articles from the chute; and
   a device to move the tray in a lateral direction so as to further align articles in the tray.

21. A device according to claim 20, wherein the device to move the tray causes the tray to move in a direction substantially parallel with the elongate dimension of the articles in the tray.

22. A device according to claim 20, wherein the device to move the tray imparts a shaking motion to the alignment tray.

23. A device according to claim 22, wherein the device to move the tray causes the alignment tray to move between, and pause at, home and away positions in an unsymmetrical manner.

24. A device according to claim 23, wherein the device to move the tray causes the alignment tray to pause at the home position longer than at the away position.

25. A device according to claim 23, wherein the device to move the tray causes the alignment tray to move from the home position to the away position and from the away position to the home position during substantially equal time intervals.

26. A device according to claim 20, wherein the tray includes sides that are angled inwardly in the downward direction.

27. A device according to claim 20, further comprising a guide chute beneath the tray to assist passage of aligned articles into a receptacle.

28. A device according to claim 20, further comprising a gate beneath the outlet position, which can be retracted to allow articles to drop into a receptacle.

29. A device according to claims 28, wherein the gate is positioned beneath the alignment tray.

30. A device according to claim 29, wherein the gate comprises a plate over which sides of the tray can be moved independently of the base.

31. A chute comprising:

a concave base extending from an inlet portion downwardly to an outlet portion of the chute and having a substantially constant lateral dimension along its length; and side walls extending from the base, an angle of inclination of the side walls to the base decreasing from the inlet portion to the outlet portion so as to cause elongated articles traveling through the chute and having an elongate dimension greater than the lateral dimension of the base to align themselves in a travel direction along the chute.

32. A chute as in claim 31, wherein the articles are inserted into the inlet portion with the elongate dimension of the articles substantially parallel to a first direction, and the chute is shaped to cause the articles to be output through the outlet portion aligned together with the elongated dimensions parallel to a second direction substantially orthogonal to the first direction.

33. A chute as in claim 31, wherein the articles are dropped in a first direction into the inlet portion, and the chute is shaped to cause the articles to be output through the outlet portion aligned together with the elongated dimensions parallel to a second direction substantially orthogonal to the first direction.

34. An apparatus comprising:

a weighing device weighing articles; and a chute having an inlet portion and an outlet portion, the weighed articles passing through the inlet portion and traveling along a travel direction of the chute to pass through the outlet portion, the chute including a concave base extending from the inlet portion downwardly to the outlet portion and having a substantially constant lateral dimension along its length, and side walls extending from the base, an angle of inclination of the side walls to the base decreasing from the inlet portion to the outlet portion so as to cause weighted articles having an elongate dimension greater than the lateral dimension of the base to align themselves in the travel direction of the chute.

35. An apparatus as in claim 34, wherein the weighed articles pass through the inlet portion with the elongate dimension of the articles substantially parallel to a first direction, and the chute is shaped to cause the articles to pass through the outlet portion aligned together with the elongate dimensions parallel to a second direction substantially orthogonal to the first direction.

36. An apparatus as in claim 34, wherein the weighed articles are dropped in a first direction to pass through the inlet portion of the chute, and the chute is shaped to cause the articles to be output through the outlet portion aligned together with the elongated dimensions parallel to a second direction substantially orthogonal to the first direction.

* * * * *